March 21, 1961 S. O. SAMPSON 2,976,372

MAGNETIC TAPE REPRODUCING SYSTEM

Filed March 2, 1959 3 Sheets-Sheet 1

INVENTOR.

SIDNEY O. SAMPSON

BY Zoltan H. Polachek

ATTORNEY

March 21, 1961 S. O. SAMPSON 2,976,372

MAGNETIC TAPE REPRODUCING SYSTEM

Filed March 2, 1959 3 Sheets-Sheet 2

INVENTOR.
SIDNEY O. SAMPSON
BY

ATTORNEY

March 21, 1961 S. O. SAMPSON 2,976,372

MAGNETIC TAPE REPRODUCING SYSTEM

Filed March 2, 1959 3 Sheets-Sheet 3

INVENTOR.
SIDNEY O. SAMPSON
BY
Zoltan P. Polachek
ATTORNEY

United States Patent Office 2,976,372

Patented Mar. 21, 1961

2,976,372

MAGNETIC TAPE REPRODUCING SYSTEM

Sidney O. Sampson, 216 E. 31st St., New York, N.Y.

Filed Mar. 2, 1959, Ser. No. 796,642

6 Claims. (Cl. 179—100.2)

This invention concerns a system for recording a magnetic tape automatically under control of a master tape in a magnetic tape reproducer.

The present invention is directed at meeting the growing need for a simplified system for reproducing on a plurality of magnetic tapes the recorded contents of a master tape. An especial need exists for precision recorded stereophonic tapes. These tapes have one, two or more pairs of parallel tracks each carrying basically the same magnetically recorded subject matter but differing somewhat due to variations in the placement of the microphones which pick up the original sources of the sounds to be recorded on the two tracks. The invention is described herein with reference to a four-track recording system, but the principles on which the invention is based may be extended to a recording tape having just two tracks or having any number of tracks, even hundreds if so desired. In prior known systems, one track or a pair of tracks of the recording tape was recorded upon and then the tape was reversed and run in the opposite direction to record on the other track or pair of tracks. The tape was run from a bulk tape supply reel to a take-up reel then back to the supply reel. It was then necessary to rerun the recorded length of tape back to the take-up reel and sever it from the bulk supply. All these operations were time-consuming, required a great deal of expensive recording and reproducing equipment with complex controls, and in addition required the attention of an engineer or highly skilled operator.

The present invention avoids the difficulties and disadvantages of the prior tape reproduction systems in a simple, foolproof manner, and makes possible high speed multiple tape and multiple track recording in a most economical fashion, while preserving the essential precision and high fidelity recording characteristics required of such tapes.

It is therefore a principal object of the invention to provide a novel automatic tape reproducing and tape recording system.

It is a further object to provide a system for recording on a plurality of tracks of a magnetic tape, signals originating at a master signal reproducing tape.

It is another object to provide a multitrack signal reproducing tape adapted for use in controlling a slave recorder.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
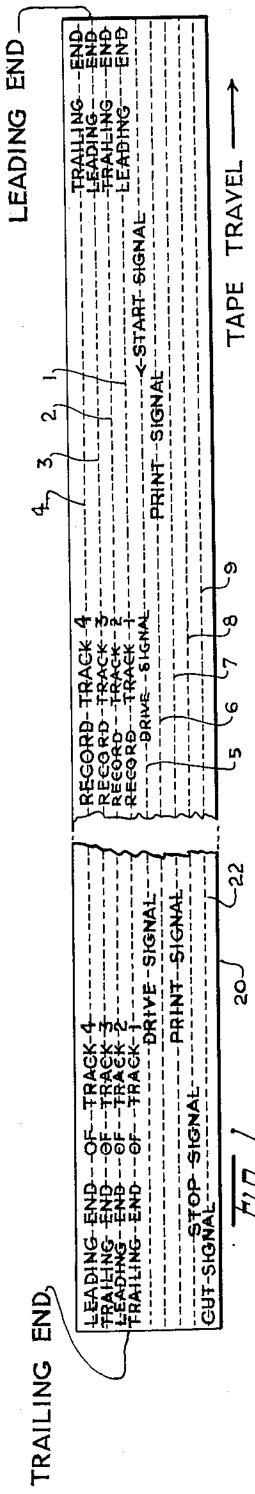
Fig. 1 is an elevational view of the back of a master tape employed in the system.
Figure 3:
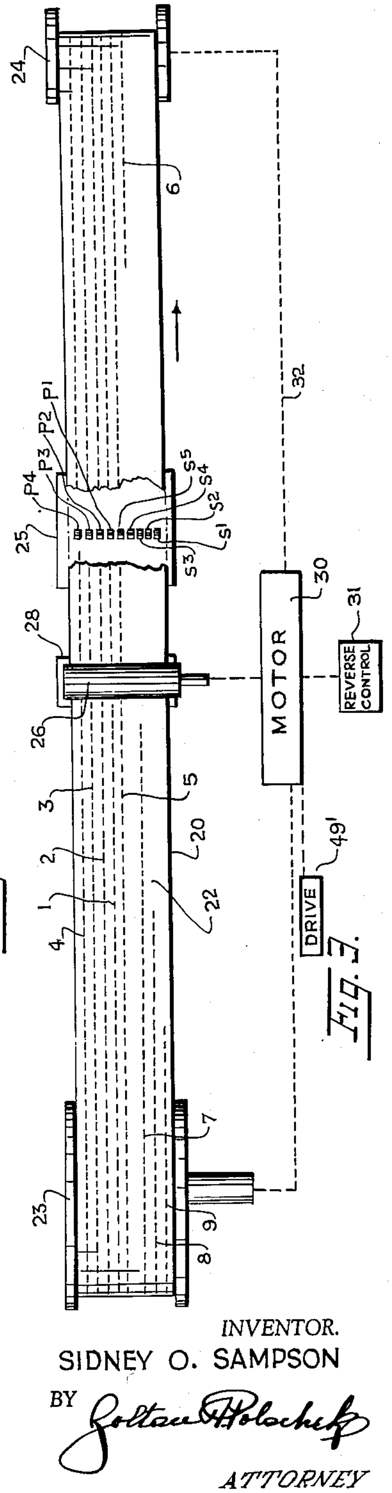
Fig. 3 is an elevational view of essential portions of a reproducer employed in the system.

Referring to Figs. 1 and 3, there is shown a master magnetic tape 20. This tape may be an inch or more in width and provided with a plastic base 22. One side of the base is coated with a magnetic material. This magnetic coat is impressed with signals on a plurality of parallel lines spaced transversely across the tape and herein designated master recorded tracks or record tracks. The tape 20 is shown with its rear uncoated side outward. The coated side faces inwardly and the dotted lines on the tape shown in Figs. 1 and 3 represent the several tracks on the coated side. The tape carries recorded tracks 1–9. Tracks 1–4 carry the signals to be recorded on the recording tape. Tracks 5–9 carry control signals for the slave recorder which operates under control of the tape 20.

Tape 20 is carried on a supply reel 23 and is driven to a take-up reel 24 past a recording head assembly 25. The tape is driven between a capstan 26 and idler roller 28 which insure constant speed of movement of the tape. A motor 30 is operatively connected to drive the capstan as well as reels 22 and 24 by conventional drive means 32 indicated by dotted lines in Fig. 3. The motor has a reverse drive control 31.

Figure 2:
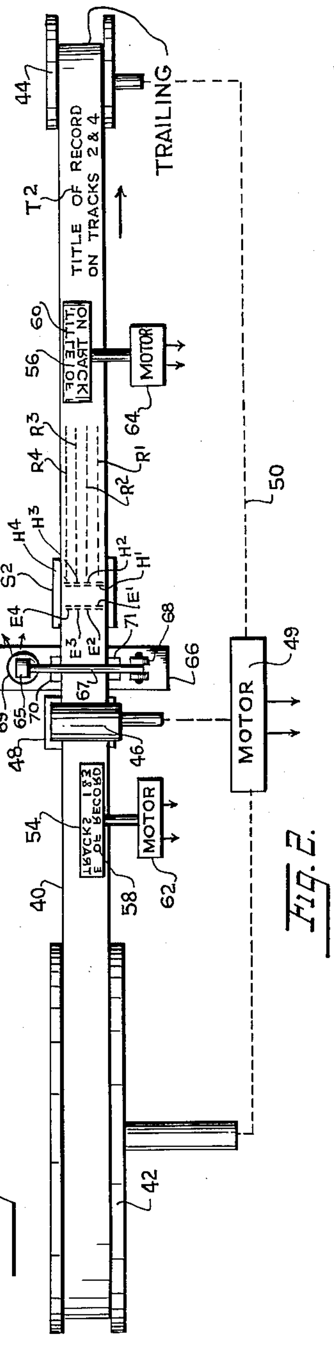
Fig. 2 is an elevational view partially schematic in form of essential portions of a slave recorder employed in the system.

Fig. 2 shows a magnetic recording tape 40 carried on a bulk tape supply reel 42. The tape is taken up on a take-up reel 44. The tape is driven at constant speed between capstan 46 and idler roller 48. The capstan and reels are driven by a drive motor 49 operatively connected by conventional drive means 50 to drive the reels and capstan. A recording head assembly 52 is juxtaposed to the coated side of the tape for recording signals thereon in a plurality of parallel tracks. A pair of spaced rollers 54 and 56 are provided for printing certain portions of the tape with titles of the subject matter recorded on the several tracks. The rollers carry type 58 and 60 in which the titles are arranged in reverse form, with the type 60 arranged to print right side up while type 58 is arranged to print upside-down for a reason to be explained. The rollers 54, 56 are driven by respective drive motors 62, 64. A tape cutting device 66 is provided for the tape. It includes a knife blade 67 mounted pivotally on a bracket 68 and carrying an armature 65 actuated by a solenoid 69 to move the blade between guide plates 70, 71 for cutting the tape.

Figure 5:
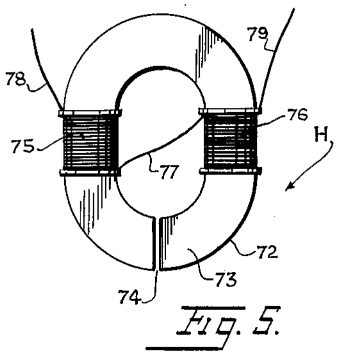
Fig. 5 is a plan view of the magnetic head as employed in the system.
Figure 6:
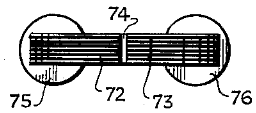
Fig. 6 is a front elevational view of the head of Fig. 5.

Each recording head assembly includes magnetic heads of the type shown in Figs. 5 and 6. Each head H has a magnetic core 72 formed by a stack of thin plates 73 arranged to provide a fine air gap 74 at their facing edges. Coils 75, 76 encircle opposing portions of the core. The coils are interconnected as indicated by the bridging conductor 77. The coils terminate in lead ends 78, 79.

Figure 7:
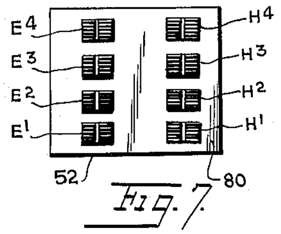
Fig. 7 is a front elevational view of a recording head assembly.

The head assembly 52 shown in Fig. 7 on an enlarged scale includes a vertically arranged stack of four heads designated H1–H4 and used for recording signals on the recording tape 40. Adjacent the heads H1–H4 are erasing heads E1–E4 respectively employed for erasing the recording tape 40 clear of spurious signals immediately before recording thereupon.

Figure 8:
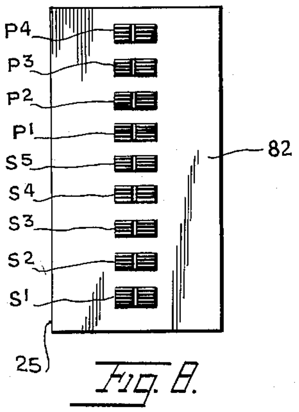
Fig. 8 is an elevational view of a reproducing head assembly.

The head assembly 25 shown in Fig. 8 on an enlarged scale includes a vertically arranged stack of nine heads designated P1–P4 and S1–S5. These heads pick up signals from the several tracks on the master recorded tape 20.

The heads of the several assemblies are encased in plastic blocks 80, 82 which provide rigid supports for the heads and insure that their spacing remains fixed.

Tape 20 is impressed with recorded signals on four tracks 1–4. It is assumed that this tape carries stereo recorded signals so that tracks 1 and 3 constitute one pair and tracks 2 and 4 constitute the other pair. Tracks 1 and 3 are recorded right to left from leading end to trailing end. Tracks 2 and 4 are recorded left to right from leading end to trailing end. On track 5 is recorded a start and drive signal. This may be a twenty-five cycle tone or any other suitable signal. On track 6 following soon after the start signal is recorded a first print signal. On track 7 near the end of the drive signal is recorded another print signal. On track 8 after the second print signal is recorded a stop signal, and on track 9 after the stop signal is recorded a cut signal. Heads P1–P4 pick up the recorded signals from the tracks 1–4 respectively. Heads S1–S5 pick up the recorded signals from tracks 5–9.

During recording on tape 40, heads H1–H4 record on tracks R1–R4, respectively, as indicated in Fig. 2. Recording on tape 40 under control of tape 20 is accomplished by the circuit shown in Fig. 4 to which reference is now made.

Each of the heads P1–P4 in reproducer 10 is connected to the input of an individual amplifier A1–A4 which has its output connected via conductors $81^a$, $81^b$ to one of heads H1–H4 respectively in recorder R. Leads $83^a$–$83^d$ extend beyond conductors $81^a$, $81^b$ for connection to similar heads of another recorder or recorders. Head S1 is connected to an amplifier 84 which has its output connected to terminals of solenoid 69 of the tape cutting device 66. Head S2 is connected to amplifier 86 whose output is connected to coil 87 of a relay assembly 88.

This relay assembly has two sets of normally open contacts 90 and 92. Contacts 90 are in series with drive motor 49 and a power supply 94. Contacts 92 are in series with an oscillator 95 connected to erasing heads E1–E4 for energizing the erasing heads. Leads $96^a$–$96^d$ extend outwardly and may be connected to erasing heads in another slave recorder or recorders.

Head S3 is connected to amplifier 100 whose output is connected to motor 62 for driving the print roller 54. Head S4 is connected to amplifier 102 whose output is connected to motor 64 for driving print roller 56. Head S5 is connected to another coil 85 of relay assembly 88 for closing contacts 92. The drive motor 30 is connected to power supply 94 and has a suitable reversing control 31 which is intended to be manually operated. A switch 104 is disposed in series with motor 30.

Figure 4:
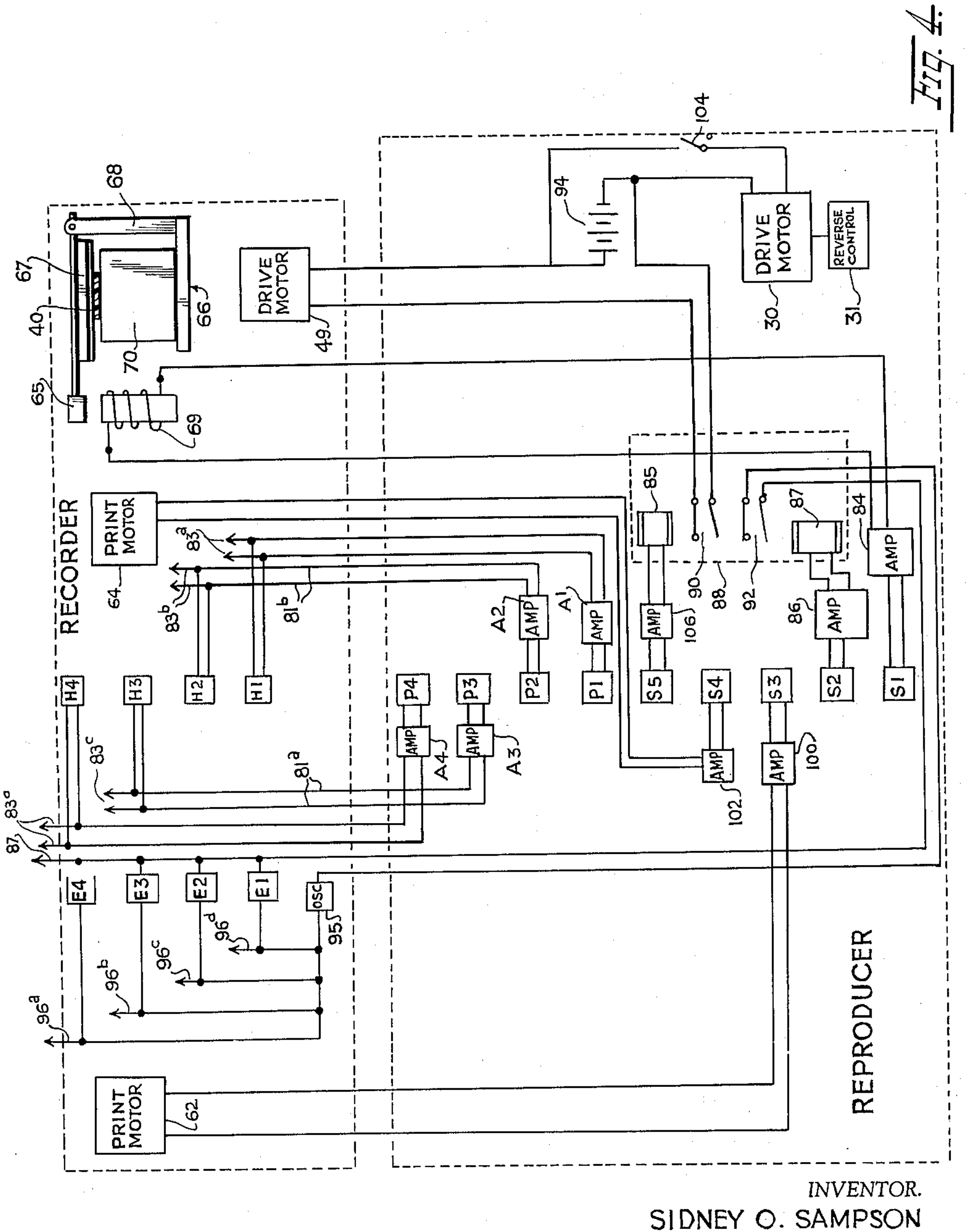
Fig. 4 is an electrical circuit diagram of the system.
Figure 10:
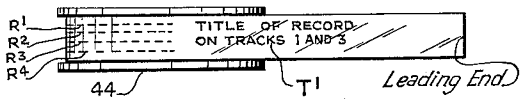
Fig. 10 is an elevational view of a completely recorded tape on a reel as produced by the invention.

In describing the operation of the circuit of Fig. 4, it will be assumed that recorder R has a tape 40 mounted thereon in the position of Fig. 2. A free end of the tape on the bulk tape reel has been threaded past roller 54 and between roller 48 and capstan 46, then past head assembly 52, roller 56 and cutter 66. The free end of the tape designated the trailing end is engaged on the take-up reel. It will be understood that when the recording operation is completed and the tape is severed from the remainder of the bulk tape, the free end of the tape which is then wound up on reel 44 will be the new leading end of the recorded tape as indicated in Fig. 10. The recording tape R is to be considered initially in the position of Fig. 1 and held stationary awaiting actuation of its drive components.

Master tape 20 is initially in a position somewhat as shown in Fig. 3. The right end of the tape is engaged on reel 24 and the remainder of the tape is engaged on reel 23. The tape passes between rollers 26 and 28 and past head assembly 25. A portion of the tape is broken away to show the dispositions of the heads of the assembly.

Suppose now that switch 104 is closed manually or by some mechanical means. Drive motor 30 will start and tape 20 will begin movement to the right as seen in Fig. 3. When the start signal passes head S5 coil 85 is energized to close contacts 90 and 92 to apply power to motor 49 and tape 40 will start moving to the right. The drive signal on track 5 continues to excite head S5 so that coil 85 remains energized. An amplifier 106 may be employed to amplify the voltage generated in head S5 and to pass an amplified current through coil 85.

As the tapes advance to the right, the right print signal which is on track 4 passes head S4 and motor 64 is energized to rotate the print roller 56 and print the title T2 at the trailing end of tape 40. This title represents the subject matter to be recorded on tracks R2 and R4. The record tracks 1–4 now reach heads P1–P4 and heads H1–H4 become energized. Heads E1–E4 become and remain energized while the drive signal is energizing head S5. Pickup of signals from tracks 1–4 and recording on tracks R1–R4, respectively, continues until the left end of the tape 20 nears the head assembly 25. Recording will normally be completed well before the second or left print signal reaches head S3. When this print signal reaches head S3 the motor 62 is energized and roller 54 prints title T1 shown in Fig. 10 on the tape 40 to represent the title of subject matter on tracks R1 and R3.

The stop signal on track 8 next reaches head S2 which energizes coil 87 via amplifier 86 and opens the relay contacts 90, 92. Motor 30 stops and the erase heads become deenergized. As the stop signal reaches head S2 the cut signal on track 1 reaches head S1 and the tape is cut by blade 67 as coil 69 becomes energized. It will be noted that the tape is cut beyond the capstan 46 so that the free end of the bulk tape is held projecting beyond the capstan and can be readily grasped for threading on a new reel 44. The full recorded reel 44 will be removed from the recorder. It will appear as shown in Fig. 10 with the new leading end of the tape 40 projecting from the reel. The newly recorded tape 40 is now ready to be played in conventional four-track stereophonic tape reproducers.

It is important to note that tracks 1 and 3 were reproduced at the reproducer 10 and recorded in the recorder R backwardly from trailing end to leading end so that reversal on reel 44 is unnecessary. The reel is in proper playing position with the beginning of recorded tracks R1 and R3 located at the beginning of the tape just beyond the title T1.

If desired, the relay assembly 88 could have its normally open contacts 90 and 92 held open by conventional spring means. Then head S2, amplifier 86 and coil 87 could be omitted because the contacts would open to stop the motor 30 and deenergize the erasing heads when the drive signal on track 5 is terminated. No stop signal would then of course be required.

The recorder motor 64 and drive motor 30 may be driven synchronously at very high speed of the order of sixty or more inches per minute. The normal playing time of the recorded tracks R1–R4 may be the usual 3¾ or 7½ inches per second. No rewinding of the recorded tape 40 is required. While the new reel 44 is being placed in the recorder, the motor 30 can be reversed by control 31 to rewind the tape 20 on reel 23 in a few seconds so that it will be ready for the recording of the next tape 40. Of course, as many slave recorders as desired may be provided as indicated by the circuit diagram, with as many reels of recorded tape produced from the single master tape at a time as desired. In a practical installation for mass production of recorded tapes a hundred to a thousand tapes 40 may be recorded at a time.

Figure 9:
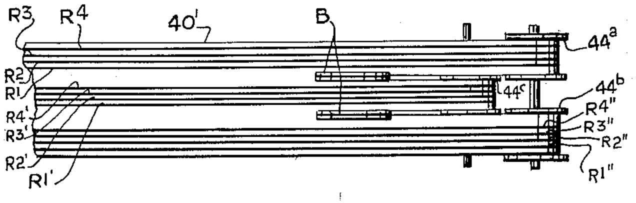
Fig. 9 is an elevational view partially schematic in form of part of a slave recorder which may be employed in the system.

When very large quantities of recorded tapes are to be produced the system may be modified as illustrated in Fig. 9. A wide band of tape 40' is provided with a series of groups of recording tracks R1–R4, R1'–R4', R1''–R4'', etc. A ten inch wide tape could have forty groups of recording tracks each about one-quarter of an inch wide. Instead of winding the right end of the tape 40' on a single reel 44 it is fed through parallel slitter blades B to divide the tape after recording into individual narrow tapes. The individual tapes would be wound on individual reels 44a, 44b, 44c, etc., driven by a common drive means 49'. Each group of tracks would be energized by heads connected in parallel as indicated in Fig. 4. Thus, with a single pass of the master tape through the reproducer, forty recorded tapes would be produced in a single recorder. A hundred such multiple track recorders would produce 4000 recorded tapes at a time, all reeled in proper manner ready for merchandising.

In producing popular recordings where the public demand runs into hundreds of thousands, the present invention provides the only known practical means for production of precision recorded tapes in sufficient quantities and at sufficiently low cost. If automatic reel handling machinery is used to remove recorded reels from the recorders, replace them with empty reels and engage the ends of the bulk tapes on the new reels, the tape duplication procedure becomes substantially entirely automatic.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A tape duplication system, comprising a master tape reproducer, at least one tape recorder operatively connected to the reproducer, and means at the reproducer for controlling starting, driving, stopping and cutting of a recording tape in the recorder, said master tape having a plurality of recorded tracks carrying recorded signals to be impressed upon the recording tape in a plurality of recording tracks, said master tape having another plurality of tracks carrying control signals for actuating said means, said recorder having tape driving means and tape cutting means actuated by the first-named means.

2. A tape duplication system, comprising a master tape reproducer, at least one tape recorder operatively connected to the reproducer, and means at the reproducer for controlling starting, driving, stopping and cutting of a recording tape in the recorder, said master tape having a plurality of recorded tracks carrying recorded signals to be impressed upon the recording tape in a plurality of recording tracks, said master tape having another plurality of tracks carrying control signals for actuating said means, said recorder having tape driving means and tape cutting means actuated by the first-named means, said recorder further having printing means for printing titles on the recording tape, said master tape having print control signals impressed thereon, and control means at the reproducer adapted to be actuated by the print control signals and connected to said printing means for actuation thereof.

3. A tape duplication system, comprising a master tape reproducer, at least one tape recorder operatively connected to the reproducer, and means at the reproducer for controlling starting, driving, stopping and cutting of a recording tape in the recorder, said master tape having a plurality of recorded tracks carrying recorded signals to be impressed upon the recording tape in a plurality of recording tracks, said master tape having another plurality of tracks carrying control signals for actuating said means, said recorder having tape driving means and tape cutting means actuated by the first-named means, said plurality of recording tracks being arranged in groups, there being the same number of tracks in each of said groups as the number of tracks in the first-named plurality of recorded tracks.

4. A tape duplication system according to claim 3, wherein said control signals are respectively tape drive signals and tape cutting signals, said reproducer including a head assembly having a separate pickup head for each of the recorded tracks, the first-named control means being actuated by certain of said pickup heads, said recorder having a plurality of recording heads disposed to impress the recorded signals on said recording tracks respectively, certain others of said pickup heads being operatively connected to said recording heads for actuating the recording heads.

5. A tape duplication system, comprising a master tape reproducer, at least one tape recorder operatively connected to the reproducer, and means at the reproducer for controlling starting, driving, stopping and cutting of a recording tape in the recorder, said master tape having a plurality of recorded tracks carrying recorded signals to be impressed upon the recording tape in a plurality of recording tracks, said master tape having another plurality of tracks carrying control signals for actuating said means, said recorder having tape driving means and tape cutting means actuated by the first-named means, said plurality of recording tracks being arranged in groups, there being the same number of tracks in each of said groups as the number of tracks in the first-named plurality of recorded tracks, means for slitting said recording tape into a plurality of narrow tape sections each having one of said groups of recording tracks thereon, and a plurality of reels engaged with slit ends of the recording tape and winding the narrow tape sections thereon.

6. A tape duplication system, comprising a master tape reproducer, at least one tape recorder operatively connected to the reproducer, means at the reproducer for controlling starting, driving, stopping and cutting of a recording tape in the recorder, said means comprising a plurality of pickup heads at the reproducer, a plurality of recording heads at the recorder, and means interconnecting said heads, said means further comprising another plurality of pickup heads, motor drive means for the recording tape operatively connected to one of the last-named pickup heads for starting and driving said tape, and others of the other plurality of pickup heads connected to printing means at the recorder for printing titles on the recording tape.

References Cited in the file of this patent

UNITED STATES PATENTS

| | | |
|---|---|---|
| 1,591,081 | Curtis | July 6, 1926 |
| 2,153,212 | Spray | Apr. 4, 1939 |
| 2,604,549 | Begun | July 22, 1952 |
| 2,698,359 | Roberts | Dec. 28, 1954 |
| 2,764,059 | Bottoms | Sept. 25, 1956 |